United States Patent
Funatsu

[11] Patent Number: 6,014,253
[45] Date of Patent: Jan. 11, 2000

[54] BINOCULAR INCLUDING FOCUS AND DIOPTER ADJUSTMENT OF DIFFERENT LENS GROUPS

[75] Inventor: Gouji Funatsu, Tokyo, Japan

[73] Assignee: Asahi Kogaku Kogyo Kabushiki Kaisha, Tokyo, Japan

[21] Appl. No.: 09/215,340

[22] Filed: Dec. 18, 1998

Related U.S. Application Data

[62] Division of application No. 08/912,843, Aug. 19, 1997, Pat. No. 5,930,035.

[30] Foreign Application Priority Data

Aug. 20, 1996 [JP] Japan ................................. 8-237249

[51] Int. Cl.⁷ .................................................. G02B 23/18
[52] U.S. Cl. ........................................... 359/418; 359/426
[58] Field of Search ..................... 359/418, 417, 359/425, 426, 416

[56] References Cited

U.S. PATENT DOCUMENTS

| | | |
|---|---|---|
| 535,862 | 3/1895 | Sawyer . |
| 3,244,072 | 4/1966 | Dowling et al. . |
| 4,013,340 | 3/1977 | Mukai et al. ............................ 359/417 |
| 4,205,894 | 6/1980 | Filipovich et al. . |
| 5,305,141 | 4/1994 | Hotta . |
| 5,572,361 | 11/1996 | Kamiya et al. ......................... 359/426 |
| 5,581,399 | 12/1996 | Abe . |
| 5,640,271 | 6/1997 | Nishitani et al. . |

FOREIGN PATENT DOCUMENTS

| | | |
|---|---|---|
| 0727685 | 8/1996 | European Pat. Off. . |
| 2365652 | 11/1975 | Germany ............................... 359/418 |
| 36135 | 2/1996 | Japan . |

OTHER PUBLICATIONS

Nikkei Mechanical No. 462, pp. 72–77, issued on Sep. 4, 1995, together with an English translation.

Minolta "Flat Binoculars", Leaflet, dated May 1995, together with an English translation.

*Primary Examiner*—Jon Henry
*Attorney, Agent, or Firm*—Greenblum & Bernstein, P.L.C.

[57] ABSTRACT

A binocular includes two telescope systems. Each telescope system includes an objective system, an erecting system, and an eyepiece system. The binocular also includes a focus adjusting actuator and a focus adjusting knob, as well as a diopter correction actuator and a diopter correction knob. A guide member guides the focus adjusting actuator and the diopter correction actuator to be aligned along an optical axis of one of the telescope systems.

12 Claims, 17 Drawing Sheets

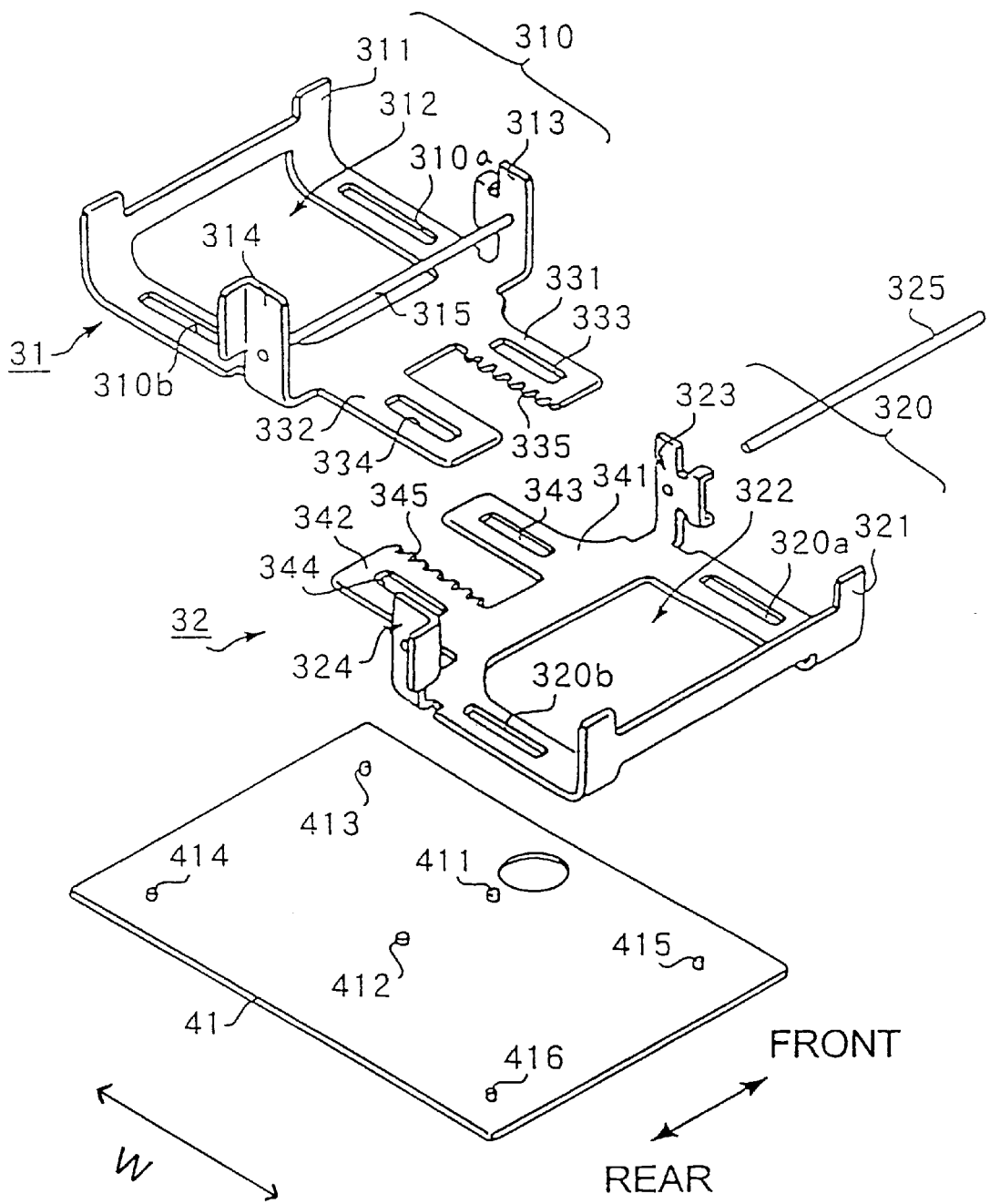

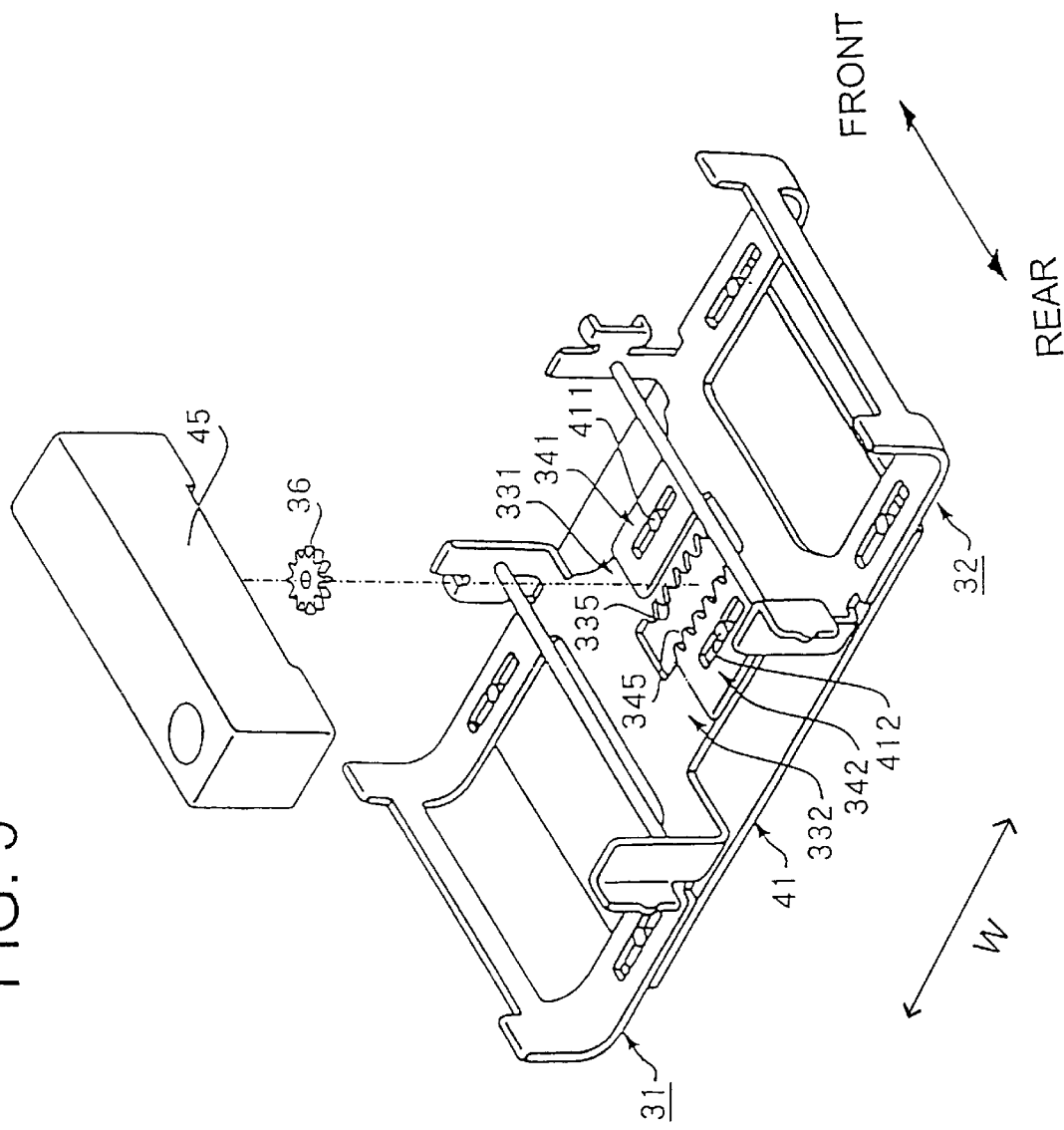

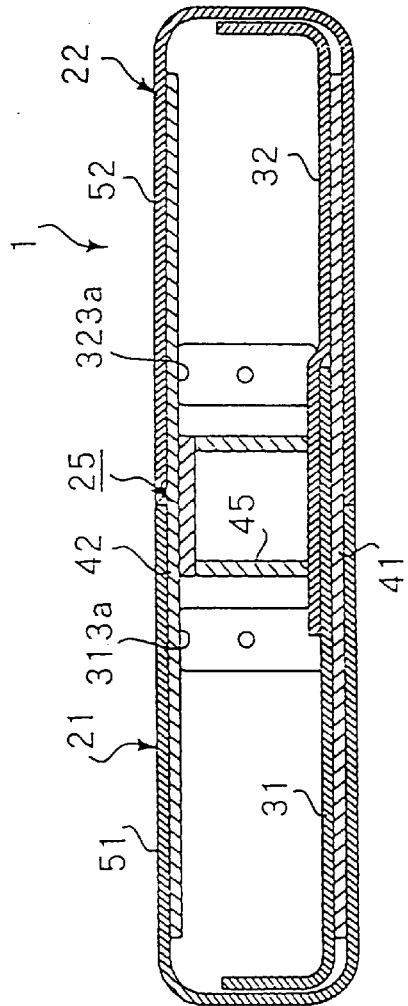
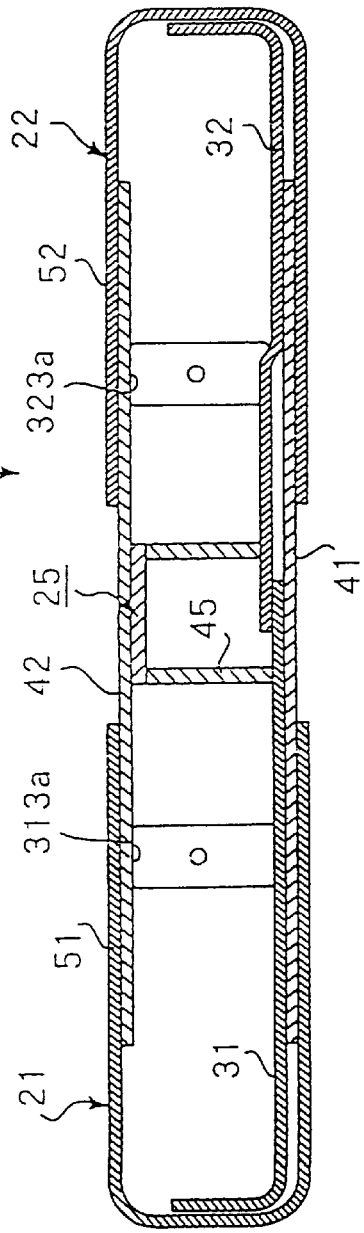

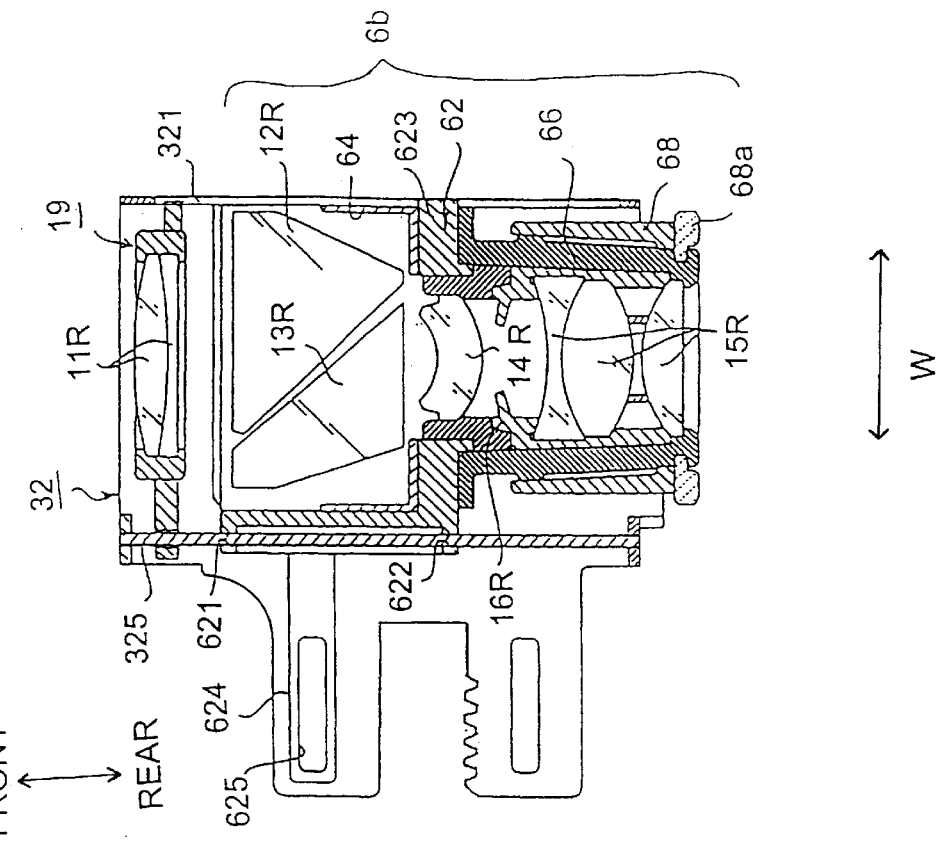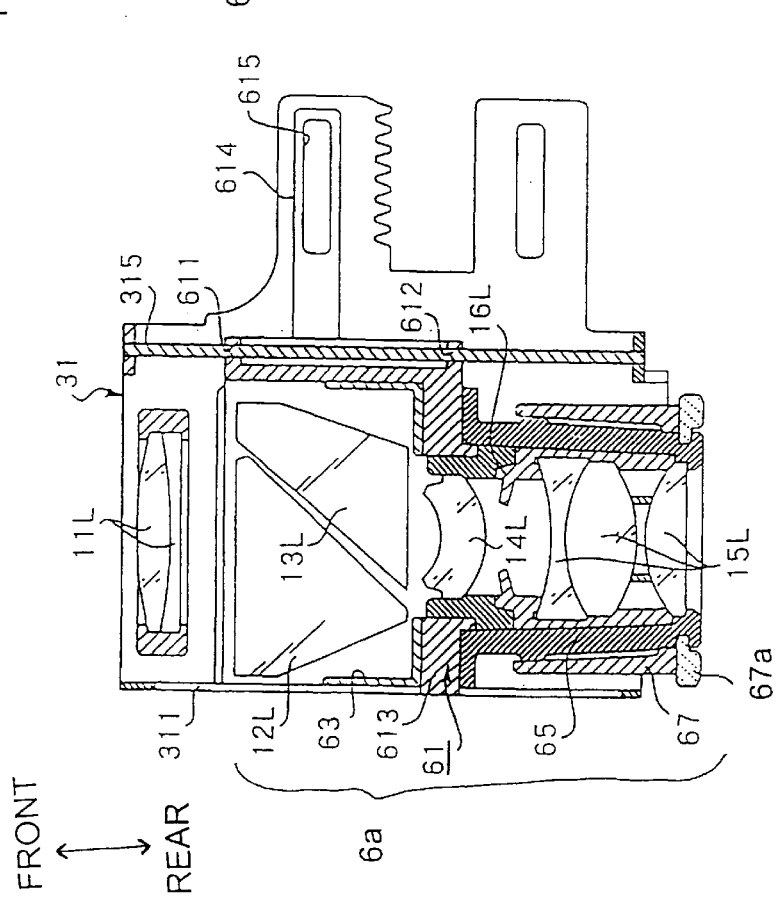

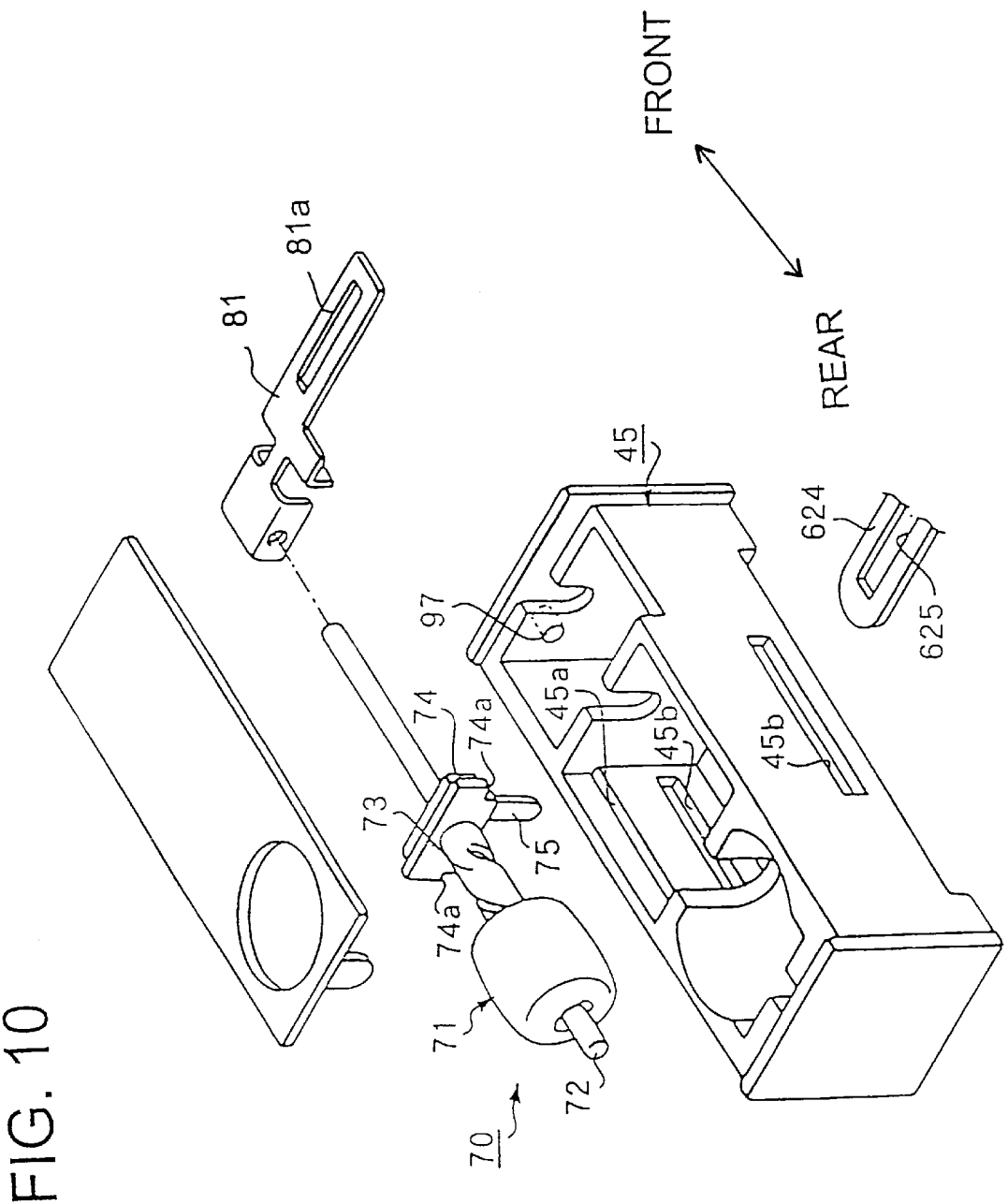

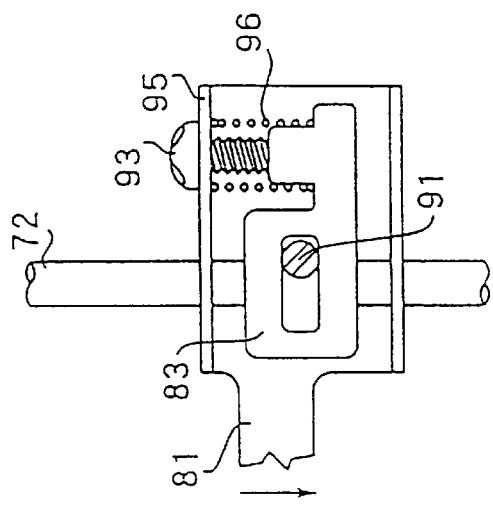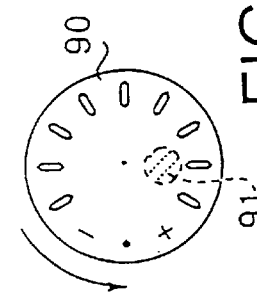
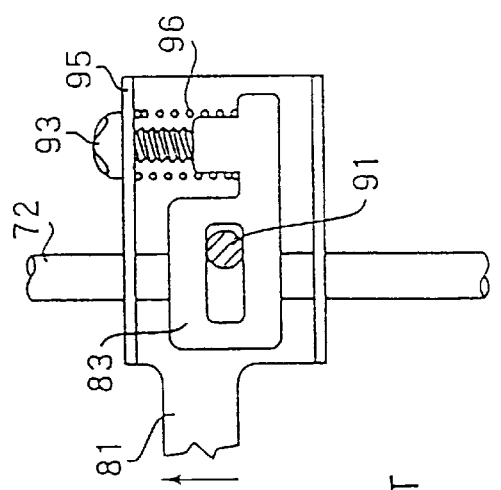
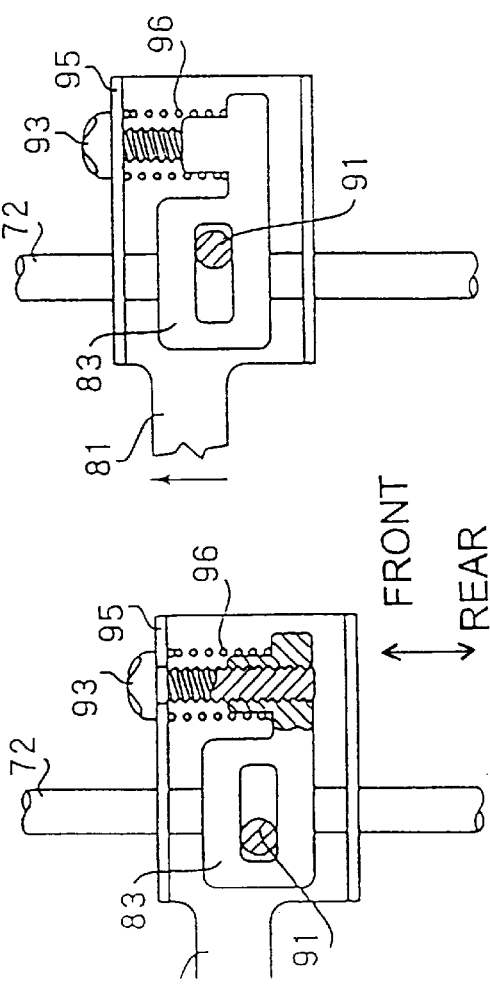

BINOCULAR INCLUDING FOCUS AND DIOPTER ADJUSTMENT OF DIFFERENT LENS GROUPS

This is a divisional of application Ser. No. 08/912,843, filed Aug. 19, 1997, now U.S. Pat. No. 5,930,035 the contents of which are herein incorporated by reference in its entirety.

BACKGROUND OF THE INVENTION

The present invention relates to a binocular.

A binocular has left and right telescope systems, each telescope system including an objective system, an erecting system and an eyepiece system.

There is a known binocular having an adjusting mechanism, wherein the eyepiece system of each telescope system is moved toward and away from a front-most lens of the objective system for a focus adjustment or the like.

However, in such a binocular, since it is necessary to provide enough space between the erecting system and the eyepiece system to allow for the movement of the eyepiece system, the size of the binocular can not be reduced.

SUMMARY OF THE INVENTION

It is therefore an object of the present invention to reduce the size of a binocular having an adjusting mechanism that moves at least an eyepiece system.

According to an aspect of the present invention, there is provided a binocular having two parallel telescope systems, each telescope system including an objective system, an erecting system and an eyepiece system. The erecting system and the eyepiece system of each telescope system belong to a movable unit which is movable toward and away from a front-most lens of the objective system.

With such an arrangement, it is possible to dispose the erecting system and the eyepiece system close to each other. Thus, the size of the binocular can be reduced.

In a particular arrangement, the movable units can be moved close to the front most lenses so that an object can not be viewed via the telescope systems. Accordingly, when the binocular is not in use, it is possible to move the movable units close to the front most lenses so that an object can not be viewed via the telescope systems. Thus, the size of the binocular when not in use can be further reduced.

It is preferred that a moving range of each movable unit includes a first range and a second range. An object can not be viewed via the telescope system when the movable unit is in the first range, while an object can be viewed via the telescope system when the movable unit is in the second range. In such case, an adjusting mechanism can be provided for synchronously moving the two movable units throughout the first and second ranges. A focus adjustment is performed when the adjusting mechanism moves the movable units in the second range.

Optionally, carriers are provided to carry the movable units. The carriers are movable toward and away from the front-most lenses of the objective system. Preferably, each carrier further carries a field stop which defines a frame of a field of view and an eye-cup which covers an eye of an observer.

In another particular arrangement, the binocular includes two casings which accommodate the two telescope systems respectively and a support frame supporting the two casings so that the two casings are slidable toward and away from each other. The carriers are movably provided to the two casings respectively. It is possible to provide the adjusting mechanism at the support frame, for moving the carriers.

According to another aspect of the present invention, a binocular includes two telescope systems, a focus adjusting knob, and a focus adjusting actuator driven by the focus adjusting knob to move a first lens group belonging to both telescope systems. A diopter correction knob, a diopter correction actuator driven by the diopter correction knob to move a second lens group belonging to one telescope system, and a guiding member which guides the focus adjusting actuator and the diopter correction actuator so that the actuators are in line with each other are also provided.

With such an arrangement, since the focus driving actuator and the diopter correction actuator are directly guided by the common guiding member, the actuators are smoothly driven. That is, the focus driving actuator and the diopter correction actuator are driven with small backlash, compared with the conventional binocular in which the diopter correction actuator is indirectly guided (via the focus adjusting actuator).

In a particular arrangement, the binocular is provided with at least one lens guide which guides the first and second lens groups. The guiding member is parallel with the lens guide. Preferably, the guiding member is a shaft member which penetrates the focus adjusting actuator and the diopter correction actuator. In one case, the focus adjusting knob is rotatably provided around the shaft member. Optionally, the diopter correction knob is rotatable about an axis perpendicular to the shaft member.

BRIEF DESCRIPTION OF THE DRAWINGS

FIG. 4 is a perspective view of slide frames and a bottom plate;

FIG. 5 is a perspective view illustrating the slide frames attached to the bottom plate;

FIGS. 8A and 8B are sectional views illustrating the movement of the casings;

FIGS. 9A and 9B are plan views of movable units;

FIG. 10 is a perspective view illustrating an operating portion;

FIGS. 18A and 18B are schematic view showing a blade member and diopter correcting knob;

FIGS. 19A and 19B are schematic view showing a blade member and diopter correcting knob moved clockwise from the FIGS. 18A, 18B position;

FIGS. 20A and 20B are schematic view showing a blade member and diopter correcting knob moved counterclockwise from the FIGS. 18A, 18B position.

DESCRIPTION OF THE PREFERRED EMBODIMENT

The present invention is described with reference to the preferred embodiment thereof.

Figure 1:
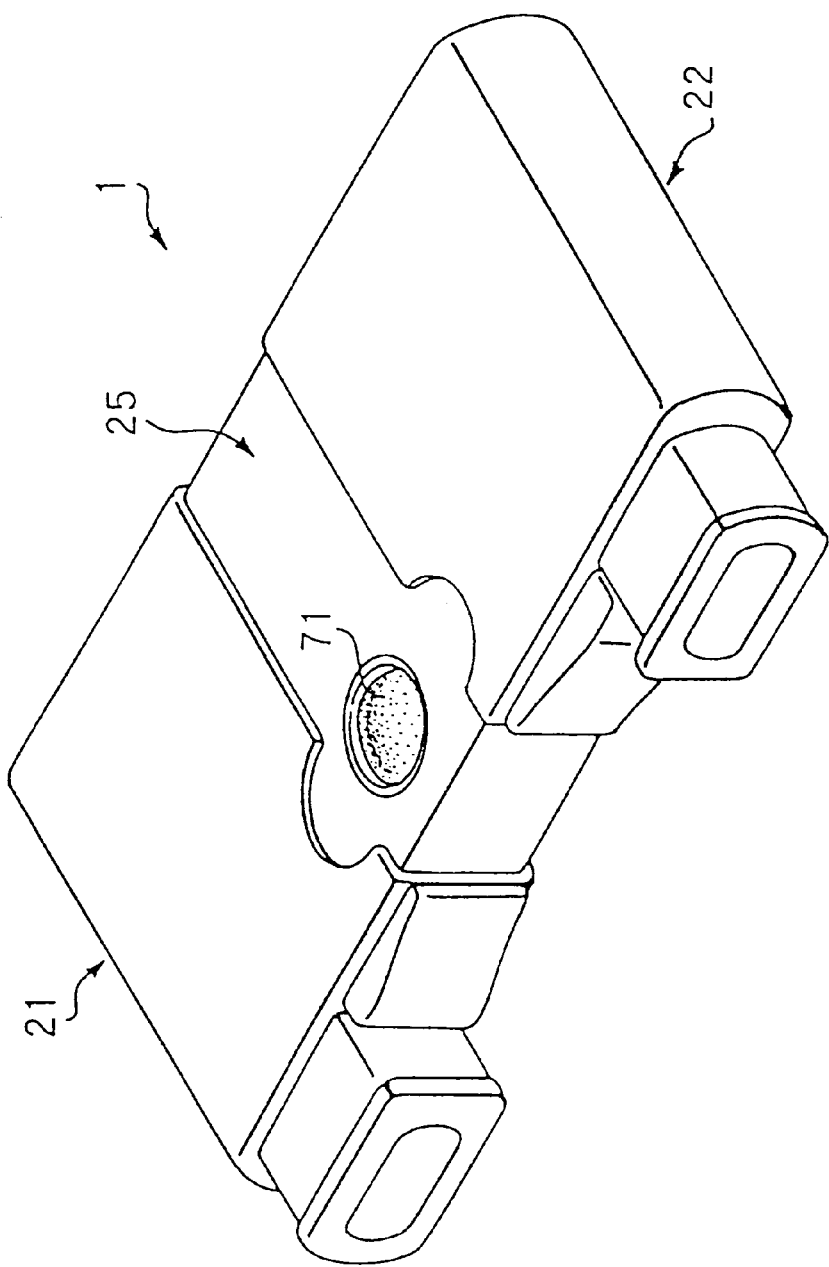
FIG. 1 is a perspective view illustrating a binocular of the embodiment.

FIG. 1 is a perspective view showing an external view of a binocular 1 according to the embodiment. The binocular 1 has left and right casings 21 and 22 and a support frame 25 which supports the casings 21 and 22.

Figure 2:
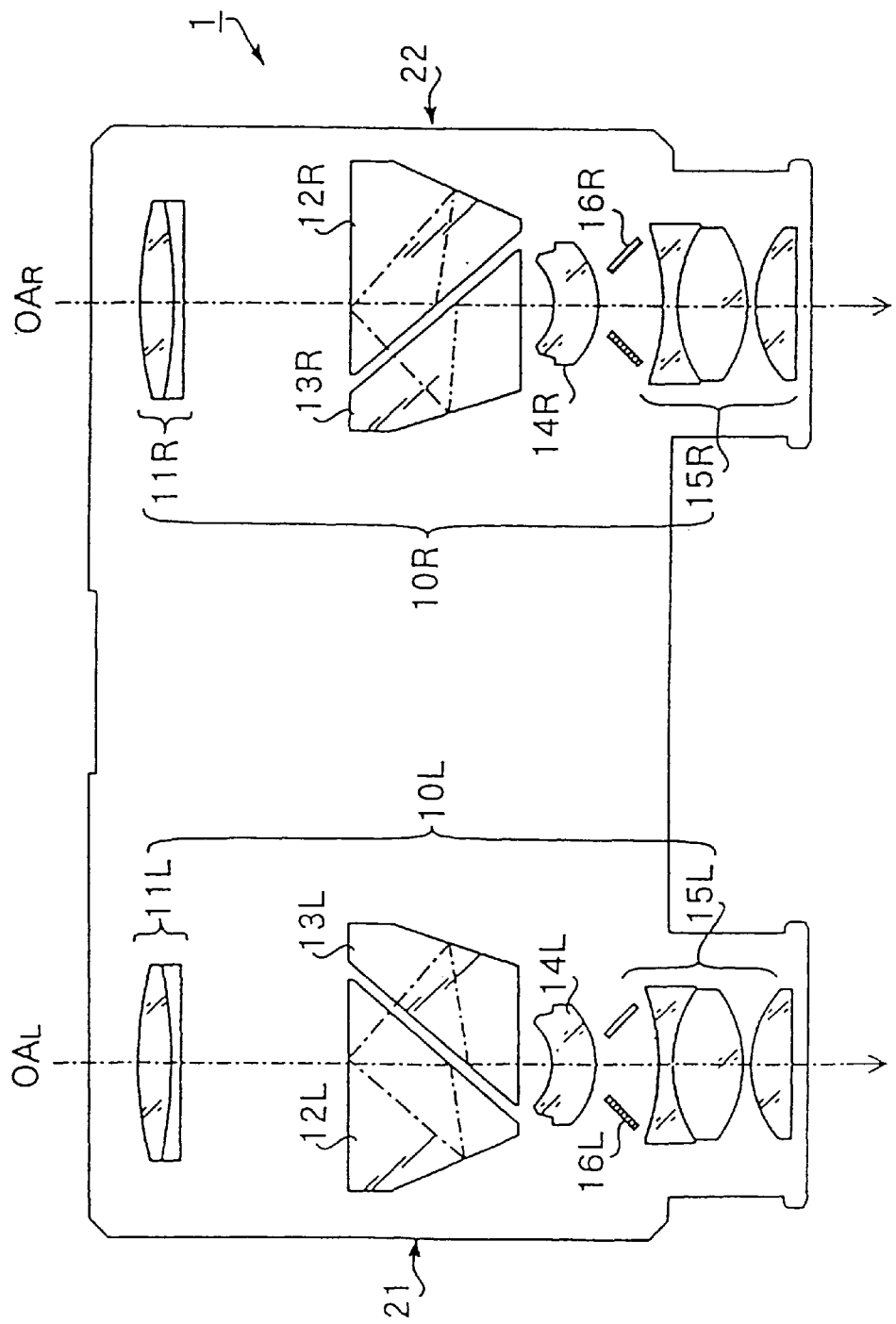
FIG. 2 is a plan view illustrating optical systems of the binocular of FIG. 1.

FIG. 2 shows the optical systems of the binocular 1. The binocular 1 includes left and right telescope systems 10L and 10R accommodated in the left and right casings 21 and 22, respectively. The binocular 1 is a so-called straight viewing type binocular in which the optical axis of an eyepiece system is in line with the optical axis of an objective system.

Since the telescope systems 10L and 10R are symmetrical with each other, the description will deal with the left telescope system 10L and the corresponding reference numbers for the right telescope system 10R will be shown in brackets.

The telescope system 10L (10R) includes first lens 11L (11R), auxiliary prism 12L (12R), roof prism 13L (13R), second lens 14L (14R), and eyepiece lens 15L (15R), which are arranged along an optical axis OAL (OAR). The first lens 11L (11R) and the second lens 14L (14R) constitute the objective system. The auxiliary prism 12L (12R) and the roof prism 13L (13R) constitute an erecting system. A field stop 16L (16R) is disposed where an image is formed by the objective system. The image formed by the objective system is magnified by the eyepiece lens 15L (15R) to be observed. Hereinafter, an objective system side of the binocular 1 is referred to as 'front', while an eyepiece side of the binocular 1 is referred to as 'rear'.

Figure 3:
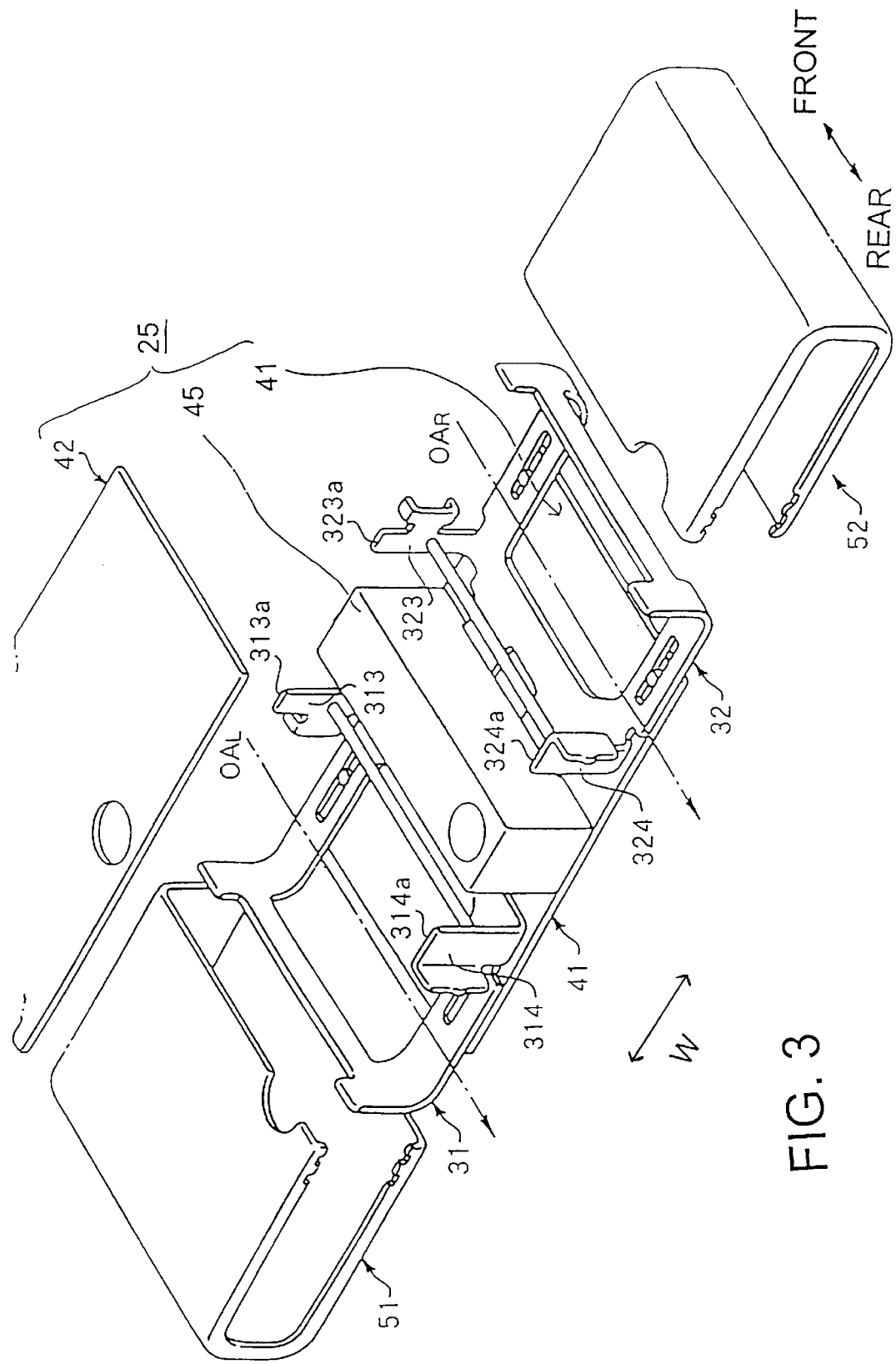
FIG. 3 is a exploded perspective view illustrating the frame structure of the of FIG. 1.

FIG. 3 is an exploded perspective view showing a frame structure of the binocular 1. The support frame 25 for movably supporting the casings 21 and 22 includes a bottom plate 41 and a top plate 42 disposed in parallel with each other, and a center block 45 disposed between the bottom and top plates 41 and 42. That is, the support frame 25 is I-shaped.

Left and right slide frames 31 and 32 are provided between the bottom plate 41 and the top plate 42, for supporting the lenses and prisms of the telescope systems 10L and 10R (FIG. 2) respectively represented by the optical axes OAL and OAR in FIG. 3. Left and right shells 51 and 52 are provided to the slide frames 31 and 32. The left slide frame 31 and the left shell 51 constitute the left casing 21 (FIG. 1), while the right slide frame 32 and the right shell 52 constitute the right casing 22 (FIG. 1).

FIG. 4 is a perspective view illustrating the left and right slide frames 31 and 32 and the bottom plate 41. Since the slide frames 31 and 32 are symmetrical with each other, the description will deal with the left slide frames 31 and the corresponding reference numbers for the right slide frames 32 will be shown in brackets.

The slide frames 31 and 32 are made of plate members with a rectangular openings 312 and 322 formed at center thereof. A side end of the slide frame 31 (32) is bent upward so as to form side wall 311 (321).

Pillars 313 and 314 (323 and 324) are provided at a front end and a rear end of the slide frame 31 (32), and are extend upward. The telescope system 10L (10R) is supported between the side wall 311 (321) and the pillars 313, 314 (323, 324). A guide shaft 315 (325) extends across the pillars 313 and 314 (323 and 324) of the slide frame 31 (32) in parallel with the side wall 311 (321). The guide shaft 315 (325) guides a movable unit along the optical axis as detailed below.

In order to guide the movement of the slide frame 31 (32), guide grooves 310a and 310b (320a and 320b) are formed in the vicinities of the front end and the rear end of the slide frame 31 (32), and extend in the width direction W of the binocular. Pins 413, 414, 415 and 416 are provided (i.e. planted) at four corners of the bottom plate 41 so as to engage the guide grooves 310a and 310b and the guide grooves 320a and 320b, respectively. Due to the engagement of the guide grooves 310a, 310b, 320a and 320b with the pins 413, 414, 415 and 416, the slide frames 31 and 32 are movable only in the width direction W of the binocular.

For synchronizing the movement of the slide frames 31 and 32, a pair of extending portions 331 and 332 extend from the slide frame 31 toward the slide frame 32, and a pair of extending portions 341 and 342 extend from the slide frame 32 toward the slide frame 31. Engaging grooves 333 and 334 (extending in the width direction W) are formed in the extending portions 331 and 332, and engaging grooves 343 and 344 are similarly formed in the extending portions 341 and 342. As shown in FIG. 5, the extending portions 331 and 332 of the slide frame 31 and the extending portions 341 and 342 of the slide frame 32 overlap with each other, above which the center block 45 is disposed. Racks 335 and 345 are formed on a front extending portion 331 of the slide frame 31 and an rear extending portion 342 of the slide frame 32 so as to be opposed to each other, and these racks 335 and 345 engage with a pinion 36 disposed on a bottom of the center block 45. By the engagement of the racks 335, 345 and the pinion 36, the slide frames 31 and 32 are moved symmetrically.

In order to determine the slidable amount of the slide frames 31 and 32, pins 411 and 412 project from the bottom plate 41 at the center, in the width direction W, of the binocular. The pin 411 engages the engaging grooves 333 and 343 and the pin 412 engages the engaging grooves 334 and 344. The grooves 333, 343, 334 and 344 have the same length, which determines the slidable amount of the slide frames 31 and 32.

As shown in FIG. 3, top end surfaces 313a and 314a (323a and 324a) of the pillars 313 and 314 (323 and 324) of the slide frame 31 (32) abut a bottom surface of the top plate 42. As a result, the vertical movement of the slide frames 31 and 32 are restricted by the bottom plate 41 and the top plate 42.

Thus, the slide frames 31 and 32 are supported by the I-shaped support frame 25 (consisting of the bottom plate 41, the top plate 42 and the center block 45), so that the slide frames 31 and 32 are slidable in the width direction W of the binocular.

Figure 6A:
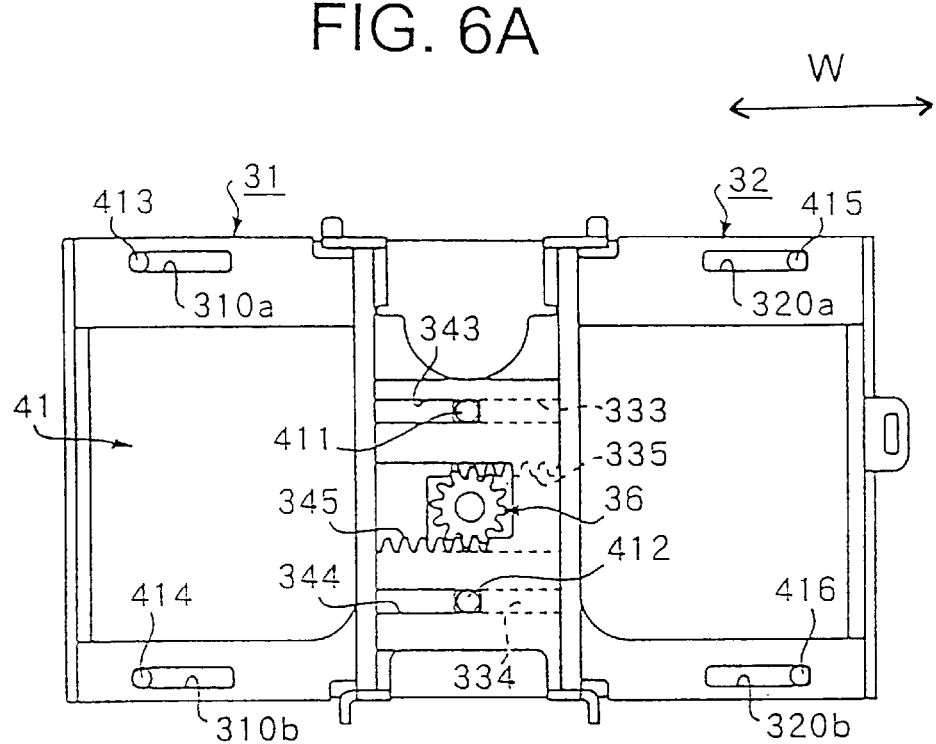
FIGS. 6A and 6B are plan views illustrating the movement of the slide frames.
Figure 6B:
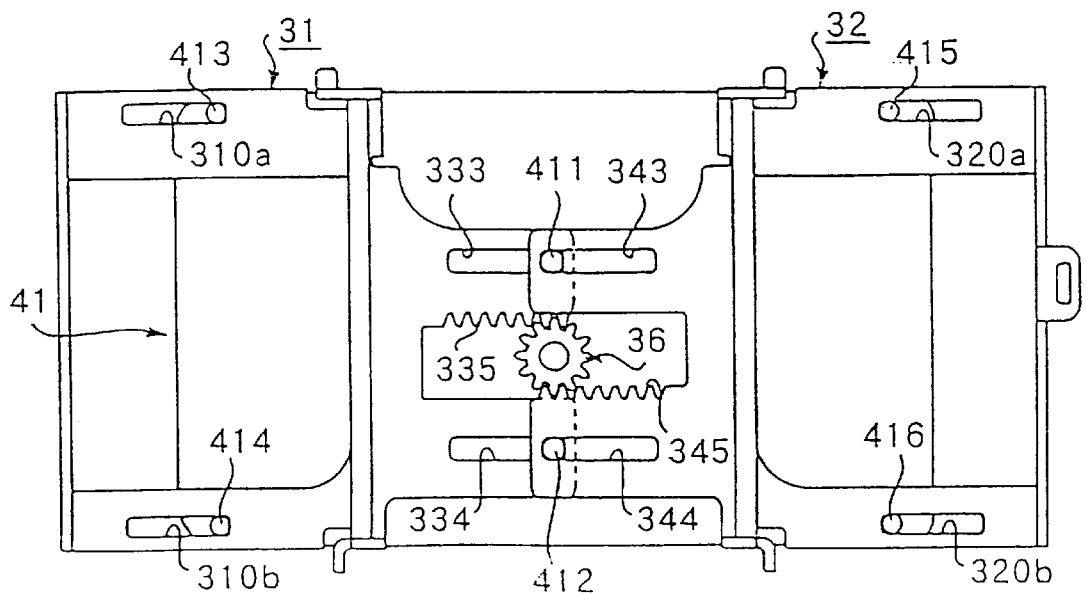

FIGS. 6A and 6B are plan views illustrating the movement of the slide frames 31 and 32. Due to the engagement between the pins 413, 414, 415 and 416 and the guide grooves 310a, 310b, 320a and 320b, the slide frames 31 and 32 are slidable only in the width direction W of the binocular. Further, since the pinion 36 engages with the racks 335 and 345 of the slide frames 31 and 32, the slide frames 31 and 32 are movable symmetrically with respect to the center of the width of the binocular as shown in FIGS. 6A and 6B.

The structure of the casing will now be described.

Figure 7:
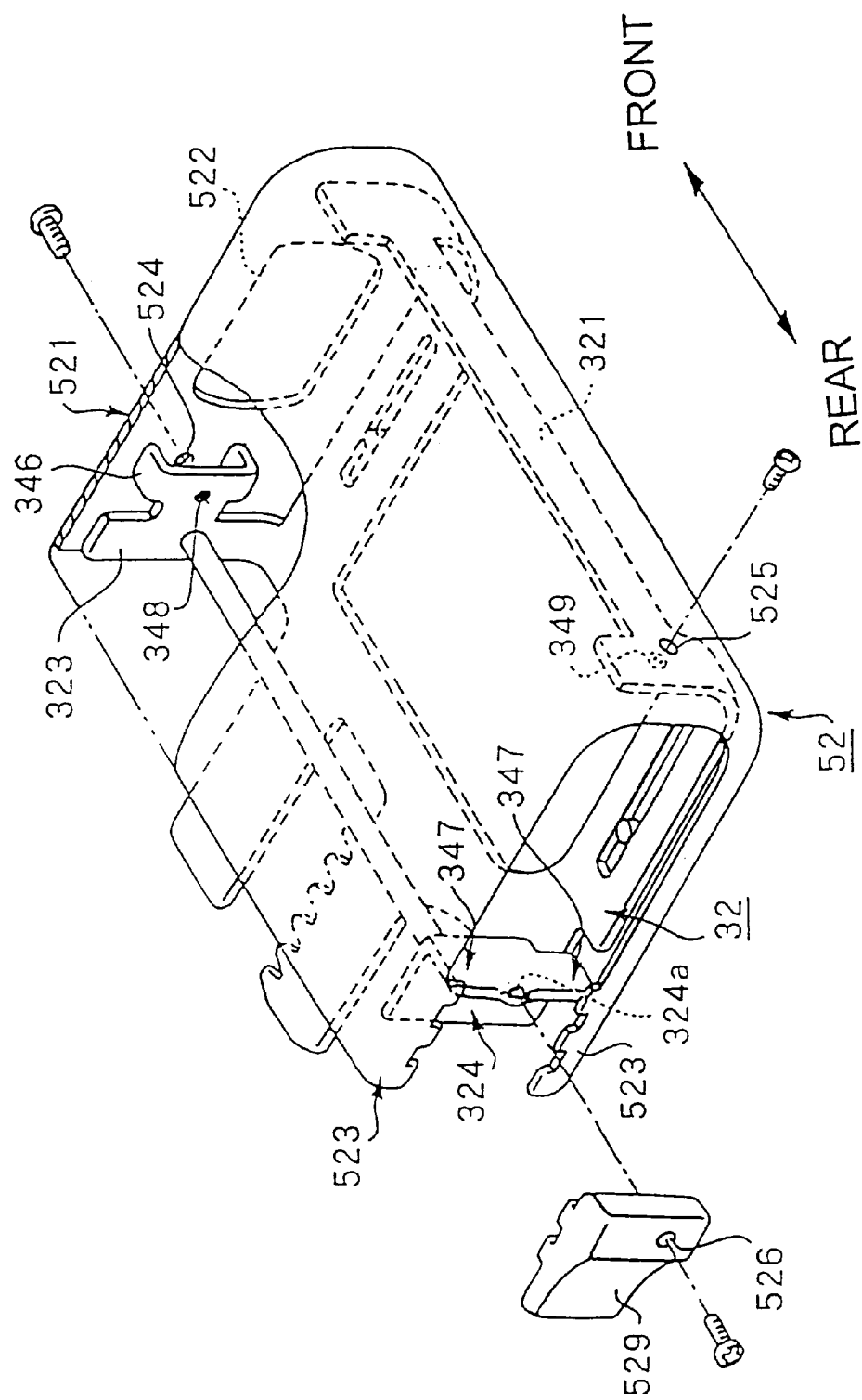
FIG. 7 is a perspective view illustrating a structure of a shell fixed to the slide frame.

FIG. 7 is a perspective view showing a structure of the right shell 52 attached to the right slide frame 32. The shell 52 is box-shaped, having an opening at the inner side end thereof. The shell 52 has a vertical wall 521 at a front end thereof. the vertical wall 521 has an opening 522 for allowing the incident light to pass through. A rear end of the shell 52 is fully open and has an peripheral portion 523 to which a rear end cover 529 is attached.

A front abutting portion 346 is protruded frontward from the front pillar 323, and abuts the wall 521 of the shell 52. The rear pillar 324 is bent rearward so as to form a rear abutting portion 347 with upper and lower ends abutting the peripheral portion 523 of the shell 52. Further, a front threaded hole 348 is formed in the front pillar 323 and a though-hole 524 is formed in the shell 52 at a position corresponding to the threaded hole 348. Similarly, a rear threaded hole 324a is formed in the rear pillar 324 and a through-hole 526 is formed in a rear cover 529. A side threaded (or tapped) hole 349 is formed on the side wall 321 and a through-hole 525 is formed in the shell 52 at a position corresponding to the tapped (or threaded) hole 349.

As constructed above, the shell 52 is fixed to the slide frame 32 by abutting the front and rear abutting portions 346 and 347 to the wall 521 and the outer edges 523, and tightening screws into the threaded holes 348, 324a and 349. Thus, the slide frame 32 and the shell 52 are fixed at front, rear and side ends of the slide frame 32. Since the left casing 21 and the left slide frame 31 are fixed in a similar manner, the description thereof is omitted.

FIGS. 8A and 8B are sectional views showing the movement of the casings 21 and 22. The bottom plate 41 and the top plate 42 (FIG. 3) are disposed between the slide frames 31 and 32 and the shells 51 and 52 in the vertical direction. When the observer grips the shells 51 and 52 and pulls them in the width direction W of the binocular 1, the casing 21 (the slide frame 31 and shell 51) and the casing 22 (the slide frame 32 and shell 52) slide supported by the bottom plate 41 and the top plate 42. The interpupillary distance is a minimum in FIG. 8A and is a maximum in FIG. 8B.

As constructed above, since the casings 21 and 22 consist of the slide frames 31 and 32 and the box-shaped shells 51 and 52, the casings 21 and 22 have high rigidity. Further, since casings 21 and 22 are supported by the I-shaped support frame 25 consisting of the bottom plate 41 and tap frame LR, even when the interval between the casings 21 and 22 is extended to be at its maximum, the binocular 1 has high rigidity. The slide frames 31 and 32 and the shells 51 and 52 are made of metal, for further enhancing the rigidity of the left and right casings 21 and 22. Further, the bottom plate 41 and the top plate 42 are also made of metal, for further enhancing the rigidity of the binocular 1 as a whole.

The structure for supporting the lenses and prisms will now be described. The binocular of the embodiment is constituted so that the focus adjustment is performed by moving the lenses and prisms from the auxiliary prism 12L and 12R to the eyepiece lenses 15L and 15R frontward and rearward along the optical axes OAL and OAR (FIG. 2). The components to be moved for focus adjusting are referred to as movable units 6a and 6b, respectively.

FIGS. 9A and 9B are plan views showing components held on left and right slide frames 31 and 32. As shown in FIGS. 9A and 9B, the left movable unit 6a (6b) includes a prism holder 63 (64) accommodating the auxiliary prism 12L (12R) and the roof prism 13L (13R), a lens holder 65 (66) accommodating the second lens 14L (14R) and the eyepiece lens 15L (15R), and a carrier 61 (62) carrying a prism holder 63 (64) and the lens holder 65 (66). Decorative rings 67 and 68 are provided around the lens holders 65 and 66. Rubber eyecups 67a and 68a are fitted to the tips of the decorative rings 67 and 68. With such an arrangement, the optical components from the auxiliary prism 12L and 12R to the eyepiece lenses 15L and 15R are supported by left and right carriers 61 and 62.

In order to guide the carrier 61 (62) frontward and rearward, insertion slots 611 and 612 (621 and 622) are provided on the carrier 61 (62), through which the guide shaft 315 (325) of the slide frame 31 (32) is inserted. The carrier 61 (62) has protrusion 613 (623) abutting the side wall 321 (322) of the slide frame 31 (32) from above, which prevents rotation of the slide frame 31 (32). Thus, the carrier 61 (62) is movable relative to the slide frame 31 (32) only frontward and rearward, that is, in the direction along the optical axis.

The structure for driving the movable units will now be described. As shown in FIGS. 9A and 9B, an arm 624 is extended leftward from a left side of the carrier 62, and which has an engaging groove 625 extending in the width direction W of the binocular. Similarly, an arm 614 is extended rightward from the carrier 61, and has an engaging groove 615 extending in the width direction W of the binocular.

FIG. 10 is a perspective view showing an operating portion 70 for driving the carriers 61 and 62. In the center block 45, the operating portion 70 includes a shaft 72 extending frontward and rearward and a focus adjusting knob 71 rotatably provided around the shaft 72. A screw 73 engages the focus adjusting knob 71 as detailed below, and is driven frontward and rearward by the rotation of the focus adjusting knob 71. A slider 74 is fixed to a tip of the screw 73, and has a lever 75 extending downward. The slider 74 has a pair of corner portions 74a which slide on guide rails 45a formed in the center block 45 and guided frontward and rearward. Grooves 45b are formed on both sides of the center block 45, for inserting arms 614 and 624 of the carriers 61 and 62 into the interior of the center block 45. The lever 75 engages grooves 615 and 625 of the arms 614 and 624 which are inserted through the grooves 45b and 45b.

Figure 11:
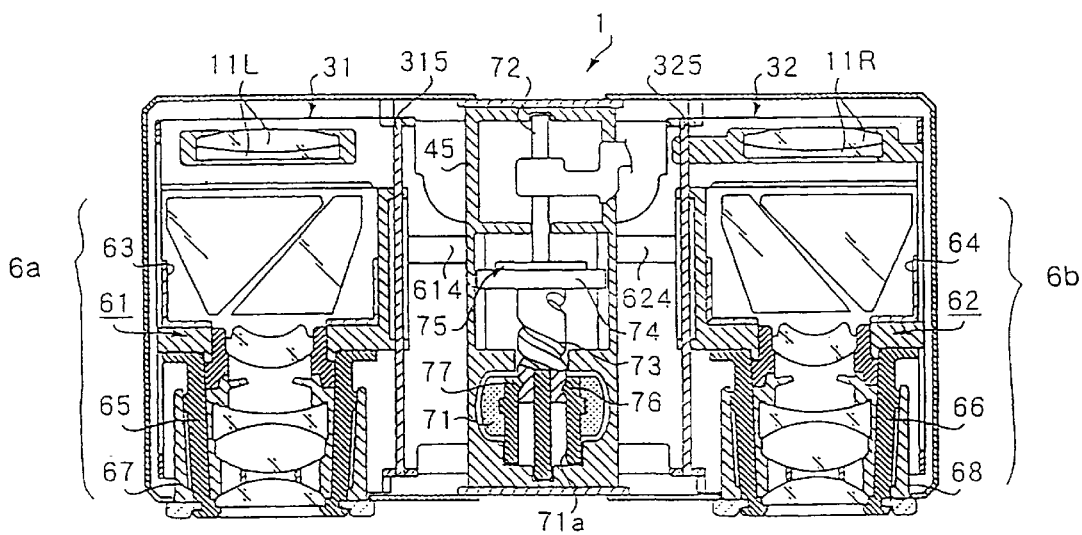
FIG. 11 is a plan view illustrating an internal structure of a binocular.
Figure 12:
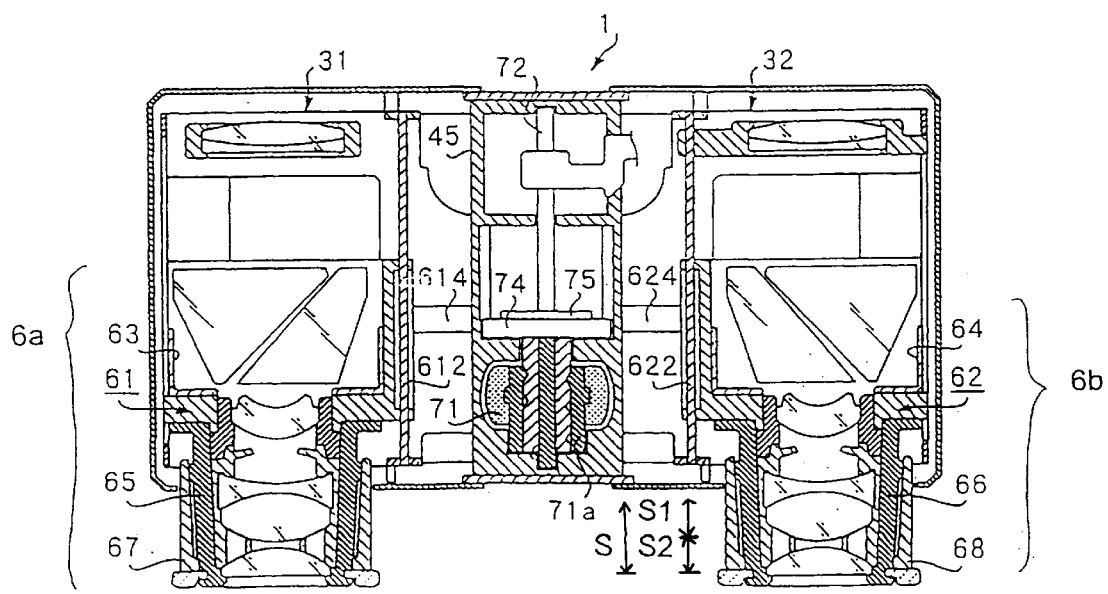
FIG. 12 is a plan view illustrating an internal structure of a binocular.

FIGS. 11 and 12 are plan views showing an internal structure of the binocular. In order to transfer the rotation of the focus adjusting knob 71 to the linear movement of the screw 73, a driving ring 71a is provided in the focus adjusting knob 71, through which the screw 73 is inserted. The driving ring 71 has two protrusions 76 and 77 formed on an inner surface thereof, engaging threads of the screw 73. Thus, when the focus adjusting knob 71 is rotated, the screw 73 linearly moves. As a result, the arms 614 and 624 move frontward and rearward by way of the slider 74, thereby moving the carriers 61 and 62 frontward and rearward. The eyepiece portions of movable units 6a and 6b are fully accommodated in FIG. 11 and protruded in FIG. 12.

As shown in FIG. 11, the eyepiece portions can be fully retracted into the casings 21 and 22 for making the binocular compact when it is not used. The entire moving range (S) of each movable units 6a and 6b includes a first range (S1) for accommodating the eyepiece portion and a second range (S2) for focus adjustment (FIG. 12). It is possible to observe an object via the telescope systems 10L and 10R (FIG. 2) only when the movable units 6a and 6b are in the second range. That is, when the movable units 6a and 6b are at a boundary between the first and second ranges, object of infinity can be observed. Thus, focus adjustment is performed by moving the movable units 6a and 6b in the second range. In particular, the entire moving range S is set to 11 mm, the first range S1 is set to 7 mm, and the second range S2 is set to 4 mm in the embodiment.

The arrangement to shift the moving speed of the movable units (with respect to the rotation of the knob) will now be described.

Figure 13:
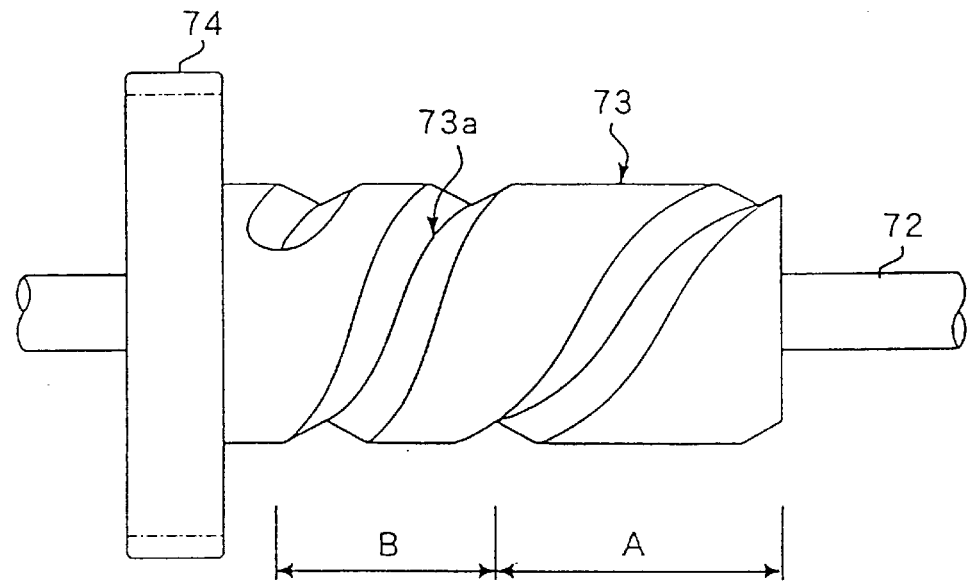
FIG. 13 is a plan view of a screw.
Figure 14:
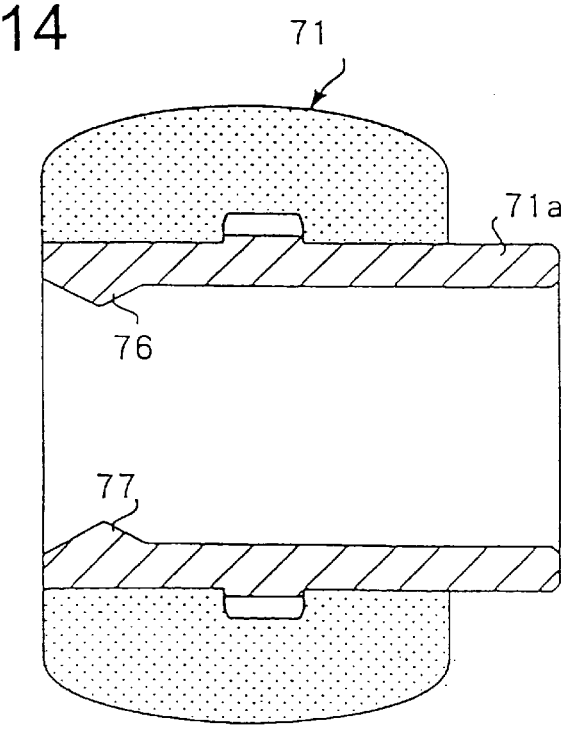
FIG. 14 is a sectional view of a focus adjusting knob.

FIGS. 13 and 14 are a side view of the screw 73 and a sectional view of the focus adjusting knob 71. The screw 73 has a large lead (7 mm) at a portion A corresponding to the first range of the movable units 6*a* and 6*b* and a small lead (4 millimeters) at a portion B corresponding to the second range. The groove 73*a* of the screw 73 has a V-shaped sectional shape and the projections 76 and 77 of the driving ring 71*a* are conical-shaped. Thus, the projections 76 and 77 can slide smoothly even at a point where the lead of the groove varies. Accordingly, the movable units 6*a* and 6*b* are moved quickly in the first range, while the movable units 6*a* and 6*b* are moved slowly (and therefore accurately) in the second range. This enables quick accommodation of the eyepiece portions and accurate focus adjustment.

When the binocular is not used, the movable units 6*a* and 6*b* are brought close to the first lenses 11L and 11R so that it is impossible to observe an object. That is, the binocular can have a smaller size in the direction along the optical axes. This feature enhances the portability of the binocular when it is not used. Further, since the accommodation of the eyepiece portions and the focus adjustment can be performed by a single mechanism, the entire structure of the binocular becomes simple.

The diopter correcting mechanism will now be described. The binocular of the embodiment is constructed so that the diopter correction is performed by moving the first lens 11R of one (right) objective system in the direction along the optical axis.

Figure 15:
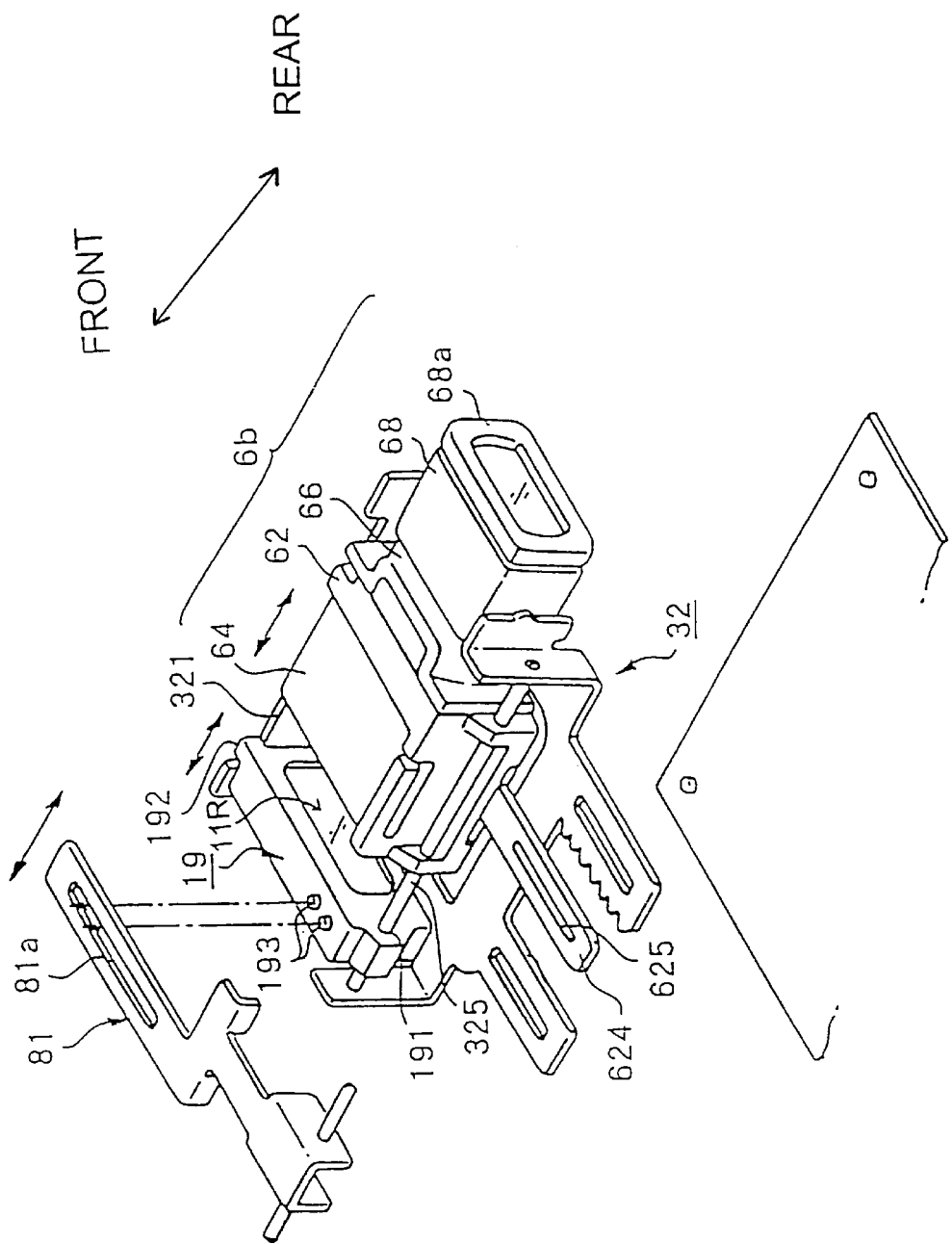
FIG. 15 is a perspective view illustrating a structure supporting a right telescope system.

FIG. 15 is a perspective view of the right slide frame 32 and optical components supported thereon. The right first lens 11R is supported by a first lens frame 19 which is guided frontward and rearward by the guide shaft 325. On the other hand, as shown in FIG. 11, the left first lens 11L is fixed to the slide frame 31. In order to move the first lens frame 19, a blade member 81 is disposed on the center block 45 as shown in FIG. 10. As shown in FIG. 15, the first lens frame 19 has two pins 193 planted thereon (i.e. projecting therefrom), and the blade 81 has an engaging groove 81*a* engaging the pins 193. The engaging groove 81*a* extends in a width direction W of the binocular so as to ensure the engagement of the engaging groove 81 and the pins 193, allowing for the movement of the slide frame 32 caused by the interpupillary adjustment. With such an arrangement, the right first lens 11R is moved by moving the blade member 81.

Figure 16:
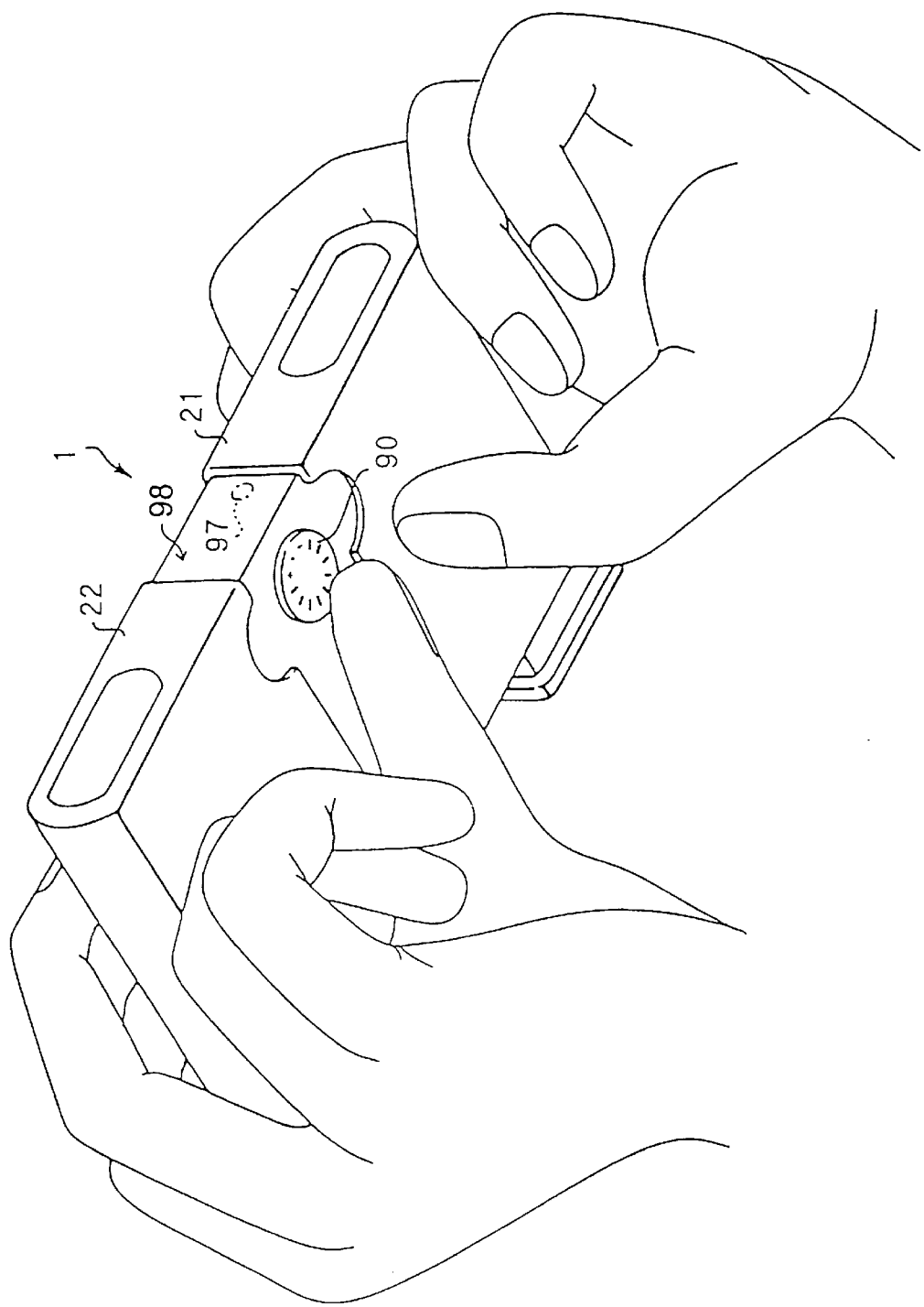
FIG. 16 is a perspective view illustrating the operation of a diopter correcting knob.

FIG. 16 shows a diopter correcting knob 90. A diopter correcting knob 90 is disposed on a bottom surface of the binocular 1 at the center in the width direction thereof. The diopter correcting knob 90 has a disk-like shape to be rotated around a vertical axis.

Figure 17:
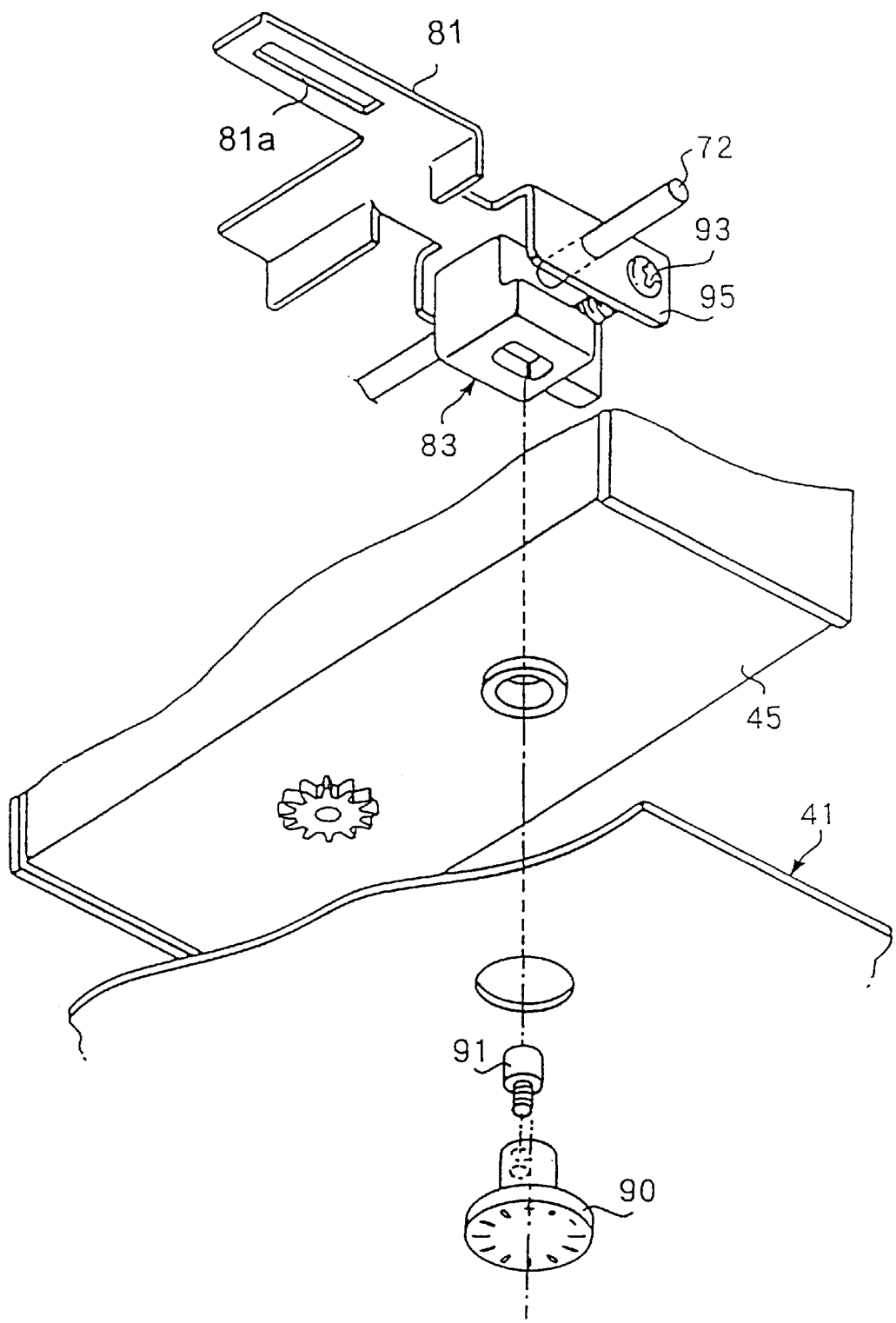
FIG. 17 is a perspective view illustrating a diopter correcting mechanism.

FIG. 17 is a perspective view illustrating the diopter correcting mechanism. In order to convert a rotation of the diopter correcting knob 90 to a linear motion of the blade member 81, a driving pin 91 is mounted on a top of the diopter correcting knob 90 with a predetermined eccentricity relative to a rotational center of the diopter correcting knob 90. A driving member 83 having a concave (or recess) to be engaged with the driving pin 91 is provided to the blade member 81. The driving member 83 is moved integrally with the blade member 81 as will be detailed below.

FIGS. 18A, 19A and 20A show movement of the driving member 83 and FIGS. 18B, 19B and 20B show the rotation of the diopter correcting knob 90 corresponding to FIGS. 18A, 19A and 20A. The driving member 83 and the diopter correcting knob 90 are seen from below. As shown in FIGS. 18A and 18B, when the diopter correcting knob 90 is set to 0, the driving pin 91 is located aside the rotational center of the diopter correcting knob 90. As shown in FIGS. 19A and 19B, when the diopter correcting knob 90 is turned clockwise, the driving pin 91 moves frontward with respect to the rotational center of the diopter correcting knob 90, thereby moving the driving member 83 frontward. Thus, the driving pin 91 advances the blade member 81 frontward. As shown in FIGS. 20A and 20B, when the diopter correcting knob 90 is turned counterclockwise, the driving pin 90 moves rearward with respect to the center of rotation of the diopter correcting knob 90, thereby moving the driving member 83 rearward. Thus, the driving pin 91 moves the blade member 81 rearward.

Since the diopter correcting knob 90 is rotatable around an axis perpendicular to the optical axis, the diopter control knob 90 can be provided on the bottom surface of the binocular 1 as shown in FIG. 17. Thus, the diopter correcting knob 90 is easily operated and does not occupy a large space.

Figure 21:
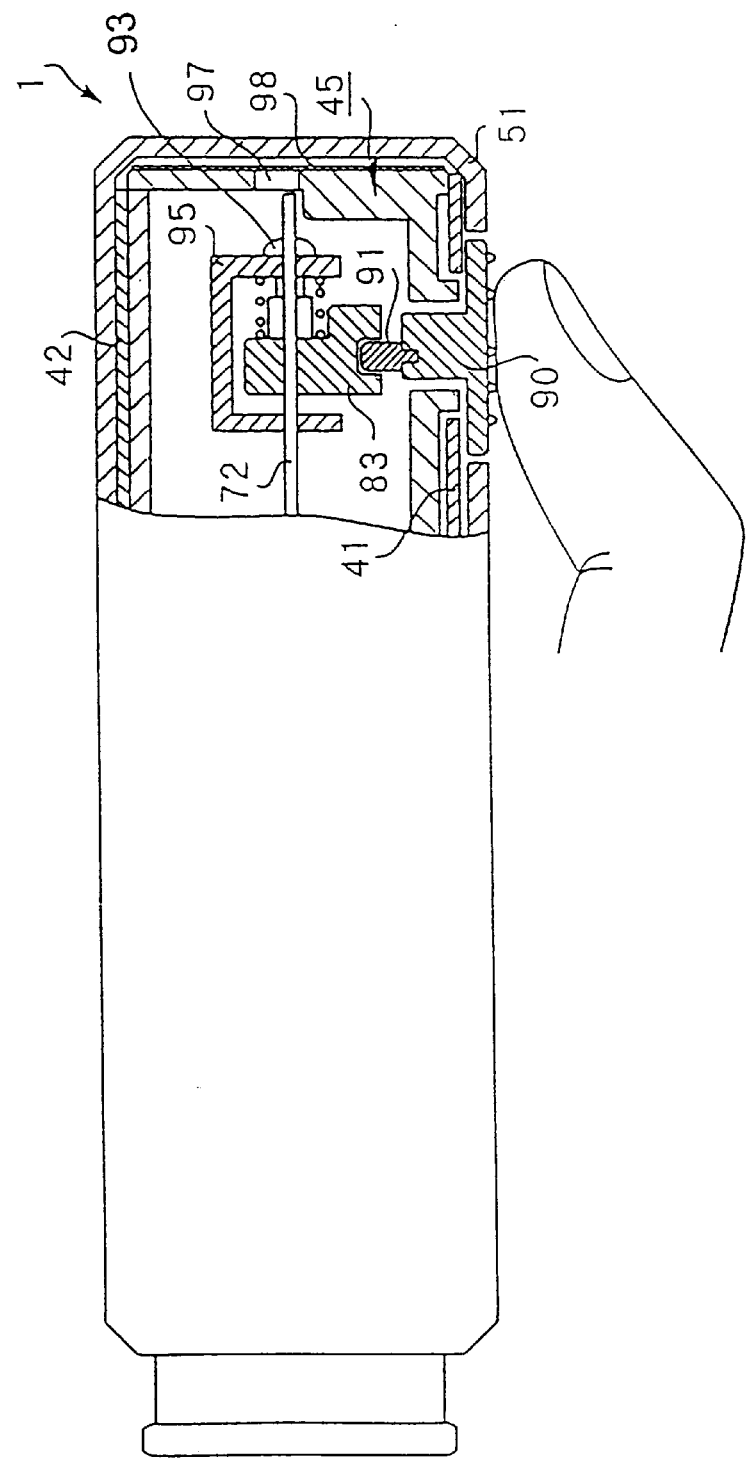
FIG. 21 is a partially sectional view of the binocular.

FIG. 21 is a partially cutaway view of the binocular. The bottom surface of the diopter correcting knob 90 is flush with an outer surface of the shell 51, so that only symbols such as ".", "+" and "−" (FIG. 18B) and knurled projections protrude downward. Thus, due to a grip between the symbols and projections and a finger of an observer, the diopter correcting knob 90 can be easily operated.

The positional relationship between the driving member 83 and the blade member 81 is adjustable, enabling a fine adjustment of a diopter in a manufacturing process (before shipment of the binocular). That is, as shown in FIG. 18A, the blade member 81 has a wall 95 formed in front of the driving member 83, a screw 93 screwed into the driving member 83 through the wall 95 and a spring 96 disposed between the wall 95 and the driving member 83. Accordingly, a position of the blade member 81 relative to the driving member 83 can be minutely adjustable in frontward-forward direction by tightening or loosening the screw 93.

As shown in FIG. 21, a tool insertion hole 97 is formed in the front portion of the center block 45 to allow a tool to be inserted therethrough for operating the screw 93. The tool insertion hole 97 is covered with a decorative seal 98 attached to a front surface of the center block 45. Therefore, it is possible to perform a fine adjustment of a diopter difference by broadening the distance between the casings 21 and 22 (as shown in FIG. 17), peeling the decorative seal 98 off, inserting a tool through the tool insertion hole 97 and turning the screw 93.

As described above, according to the embodiment, the casings 21 and 22 slide symmetrically with respect to the center in the width direction of the binocular 1 and the knobs 71 and 90 are disposed at the center of the width direction of the binocular 1. Accordingly, the knobs 71 and 90 are located at the center in the lateral direction of the binocular irrespective of the interpupillary. Thus, the knobs 71 and 90 are easily operated by both right-handed and left-handed observers.

As shown in FIGS. 10 through 12 and 17, a focus adjusting actuator (the screw 73 and the lever 75) and a diopter correction actuator (the driving member 83 and the blade member 81) are directly guided by the shaft 72 so that the actuators are in line with each other. The shaft 72 is parallel with guide shafts 315 and 325 which guide the carriers 61 and 62 of the movable units 6*a* and 6*b*.

With such an arrangement, since the focus driving actuator and the diopter correction actuator are directly guided by the common shaft 72, the actuators are smoothly driven, with small backlash.

Although the structure and operation of a binocular is described herein with respect to the preferred embodiments, many modifications and changes can be made without departing from the spirit and scope of the invention.

The present disclosure relates to subject matter contained in Japanese Patent Application No. HEI 08-237249 filed on Aug. 20, 1996, which is expressly incorporated herein by reference in its entirety.

What is claimed is:

1. A binocular comprising:

two telescope systems;

a focus adjusting knob;

a focus adjusting actuator driven by said focus adjusting knob to move a first lens group belonging to each of said two telescope systems;

a diopter correction knob;

a diopter correction actuator driven by said diopter correction knob to move a second lens group belonging to one of said two telescope systems; and a guiding member which guides said focus adjusting actuator and said diopter correction actuator so that said actuators are aligned along a line extending in a direction parallel to an optical axis of one of said two telescope systems.

2. The binocular according to claim 1, further comprising at least one lens guide which guides said first and second lens groups, wherein said guiding member is parallel with said lens guide.

3. The binocular according to claim 1, wherein said guiding member is located at the center of said binocular in the width direction thereof.

4. The binocular according to claim 1, wherein said guiding member is a shaft member, said shaft member penetrating said focus adjusting actuator and said diopter correction actuator.

5. The binocular according to claim 4, wherein said focus adjusting knob is rotatably provided around said shaft member.

6. The binocular according to claim 4, wherein said diopter correction knob is rotatable about an axis perpendicular to said shaft member.

7. The binocular according to claim 1, wherein said first lens group includes eyepiece systems of both telescope systems and said second lens group includes an objective system of one of said telescope systems.

8. A binocular comprising:

two telescope systems having optical axes extending parallel to each other;

a focus adjusting mechanism that moves a first lens group belonging to each of said two telescope systems;

a diopter correction mechanism which moves a second lens group belonging to one of said two telescope systems; and a shaft extending parallel to the optical axes of said telescope systems, said shaft being directly coupled to a focus adjusting actuator and to a diopter correction actuator, said focus correction actuator being connected to actuate said focus adjusting mechanism and said diopter correction actuator being connected to actuate said diopter correction mechanism.

9. The binocular according to claim 8, each of said two telescope systems comprising an objective system, an erecting system and an eyepiece system.

10. The binocular according to claim 8, said shaft being located centrally between the optical axes of said two telescope systems.

11. The binocular according to claim 8, said focus adjusting actuator being rotatable concentrically with said shaft.

12. The binocular according to claim 8, said diopter correction actuator being rotatable about an axis perpendicular to said shaft.

* * * * *